United States Patent [19]

Hasenour

[11] 4,221,844

[45] Sep. 9, 1980

[54] DECORATIVE COATING OF METAL

[76] Inventor: James A. Hasenour, 821 Church Ave., Jasper, Ind. 47546

[21] Appl. No.: 938,961

[22] Filed: Sep. 1, 1978

Related U.S. Application Data

[63] Continuation-in-part of Ser. No. 815,104, Jul. 13, 1977, abandoned.

[51] Int. Cl.[3] .......... B32B 15/18

[52] U.S. Cl. .......... 428/623; 108/161; 297/463; 428/624; 428/667

[58] Field of Search .......... 428/457, 464, 913, 622, 428/623, 624, 625, 626, 666, 667, 927; 148/31.5; 297/463; 108/161; 248/188.1

[56] References Cited

U.S. PATENT DOCUMENTS

| | | | |
|---|---|---|---|
| 1,845,016 | 2/1932 | D'Atri | 428/457 |
| 2,333,206 | 11/1943 | Sloan | 428/457 |
| 2,763,054 | 9/1956 | Wojtowicz | 428/457 |
| 3,106,484 | 10/1963 | Miller | 428/624 |
| 3,321,420 | 5/1967 | Unger | 428/464 |
| 4,072,783 | 2/1978 | Yasue et al. | 428/467 |
| 4,074,011 | 2/1978 | Taramae et al. | 428/422 |

*Primary Examiner*—L. Dewayne Rutledge
*Assistant Examiner*—Michael L. Lewis
*Attorney, Agent, or Firm*—Warren D. Flackbert

[57] ABSTRACT

The decorative coating of metal, such as chrome plated cold rolled steel, is accomplished through use of a layout fluid which presents a highly desirable colored finish without any loss of the shine normally associated with chrome plating. The resulting colored metal part is achieved at a modest cost when compared to brass or other colored plating.

2 Claims, No Drawings

DECORATIVE COATING OF METAL

The present application is a continuation-in-part of now-abandoned patent application Ser. No. 815,104, filed July 13, 1977, with the same title and inventor.

As is known, the use of metal for furniture is widespread, such as for chairs, steel-glass type tables or the like. One drawback, however, is that the metal in use has mostly been chrome or brass plated, i.e. where other color selection is not possible at an inexpensive cost. In this connection, if various decorator-color metals were available, such would result in additional uses to satisfy different color schemes in the home or office and, thereby, add to overall furniture sales volume.

The invention overcomes the preceding limitation by providing for the decorative coating of a metal member in a variety of colors. Basically, the invention utilizes a layout fluid, such as that used in tool and die work. The layout fluid is applied to the metal member after the latter has been chrome plated, creating a highly attractive shiny colored finish which could otherwise be achieved only through expensive plating operations.

More specifically, and by way of example, the furniture of the type mentioned hereabove employs cold rolled steel which, prior to any plating, is polished and buffed. The steel stock is then nickel plated, followed by chrome plating. At such time, and when the steel is warm, or at least at room temperature, the layout fluid is applied to the desired surface or surfaces. The steel stock then assumes a finished color without any loss of the brightness or shine associated with chrome. If desired, lacquer can be applied over the decorative or layout fluid coating to afford a hard finish.

As to the layout fluid, such is typically defined as an organic dye suspended in a liquid vehicle. In this connection, a preferred layout fluid consists essentially of organic dyes (1%), a wet nitrocellulose vehicle (up to 5%), denatured alcohol solvents (up to 49%), butyl acetate solvents (up to 30%), and butyl alcohol solvents (up to 11%), together, in one form, with a hydrocarbon propellant (40%).

In any event, many colors can be achieved on the steel stock, each being suitable for a particular decorative purpose. The layout fluid is readily applied to the chrome plated steel and, as stated, the shine or brightness effect of the chrome is still highly apparent but, in this instance, in a preselected color.

From the preceding, it should be evident that the invention satisfies a need in the industry to achieve colored steel in an inexpensive manner. The combination of the decorative layout fluid coating and the chrome plated steel blends to define a highly utilitarian end product usable in various areas. While the preceding discussion mentions furniture, such should, however, be considered illustrative and not as limiting the scope of the following claims:

I claim:

1. In tables and chairs of the type utilizing visible chromium plated steel framework, the improvement which comprises a layout composition in a preselected color disposed on said framework prior to assembly and presenting a finished surface brightness equivalent to that of the covered chromium plated steel but in said preselected color.

2. The improvement of claim 1 where said layout composition is overlaid by a layer of lacquer.

* * * * *